(12) United States Patent
Cutsforth et al.

(10) Patent No.: US 9,560,729 B2
(45) Date of Patent: Jan. 31, 2017

(54) GROUNDING ROPE FOR A SHAFT GROUNDING APPARATUS OF A DYNAMO-ELECTRIC MACHINE

(71) Applicant: Cutsforth, Inc., Cohasset, MN (US)

(72) Inventors: Robert S. Cutsforth, Bellingham, WA (US); Jason R. Kammerer, Bellingham, WA (US)

(73) Assignee: Cutsforth, Inc., Cohasset, MN (US)

( * ) Notice: Subject to any disclaimer, the term of this patent is extended or adjusted under 35 U.S.C. 154(b) by 207 days.

(21) Appl. No.: 14/020,992

(22) Filed: Sep. 9, 2013

(65) Prior Publication Data

US 2015/0070810 A1 Mar. 12, 2015

(51) Int. Cl.
| | |
|---|---|
| *H01H 47/00* | (2006.01) |
| *H05F 3/00* | (2006.01) |
| *H05F 3/02* | (2006.01) |
| *H01R 39/64* | (2006.01) |
| *H02G 3/04* | (2006.01) |
| *H01R 4/24* | (2006.01) |
| *H01R 39/12* | (2006.01) |
| *H01R 39/24* | (2006.01) |

(52) U.S. Cl.
CPC .............. *H05F 3/02* (2013.01); *H01R 39/64* (2013.01); *H02K 11/40* (2016.01); *H01R 39/12* (2013.01); *H01R 39/24* (2013.01)

(58) Field of Classification Search
CPC ............................. H05F 3/02; H02K 11/0089
USPC ......................................... 361/220; 174/68.1
See application file for complete search history.

(56) References Cited

U.S. PATENT DOCUMENTS

| | | | | |
|---|---|---|---|---|
| 2,418,260 | A | * | 4/1947 | Holder ............................ 217/93 |
| 3,672,006 | A | * | 6/1972 | Fidrych ........................ 24/122.6 |
| 4,873,512 | A | | 10/1989 | Miller |
| 4,922,068 | A | * | 5/1990 | Bangs ........................... 200/271 |
| 5,227,950 | A | | 7/1993 | Twerdochlib |
| 5,233,499 | A | * | 8/1993 | Twerdochlib ................. 361/212 |
| 6,225,811 | B1 | * | 5/2001 | Bruning et al. ............. 324/544 |
| 7,339,777 | B2 | * | 3/2008 | Barnard et al. ............... 361/212 |
| 8,493,707 | B2 | | 7/2013 | Cutsforth |

(Continued)

FOREIGN PATENT DOCUMENTS

| | | |
|---|---|---|
| EP | 1275608 A1 | 1/2003 |
| EP | 2019323 A2 | 1/2009 |

OTHER PUBLICATIONS

"Wiring and Cabling", XP002740966, 6 pages, Dec. 1, 1962, Retrieved from the Internet: http://www.dairiki.org/hammond/cable-lacing-howto/ [retrieved on Jun. 15, 2015].

(Continued)

*Primary Examiner* — Thienvu Tran
*Assistant Examiner* — Lucy Thomas
(74) *Attorney, Agent, or Firm* — Seager, Tufte & Wickhem LLP

(57) ABSTRACT

A grounding rope assembly for electrically grounding a rotatable conductive shaft of a dynamo-electric machine. The assembly includes a grounding rope member including a plurality of conductive wires extending along the length of the grounding rope member and one or more discrete fixation points intermediate the first and second ends of the grounding rope member. Two or more of the plurality of conductive wires are affixed together at each of the discrete fixation points.

24 Claims, 10 Drawing Sheets

(56) References Cited

U.S. PATENT DOCUMENTS

2001/0038938 A1* 11/2001 Takahashi et al. ............. 429/53
2004/0233592 A1  11/2004 Oh et al.
2013/0032373 A1   2/2013 Cutsforth

OTHER PUBLICATIONS

"Wiring and Cabling", Workmanship and Design Practices for Electronic Equipment, Bureau of Naval Weapons, Dec. 1, 1962.

* cited by examiner

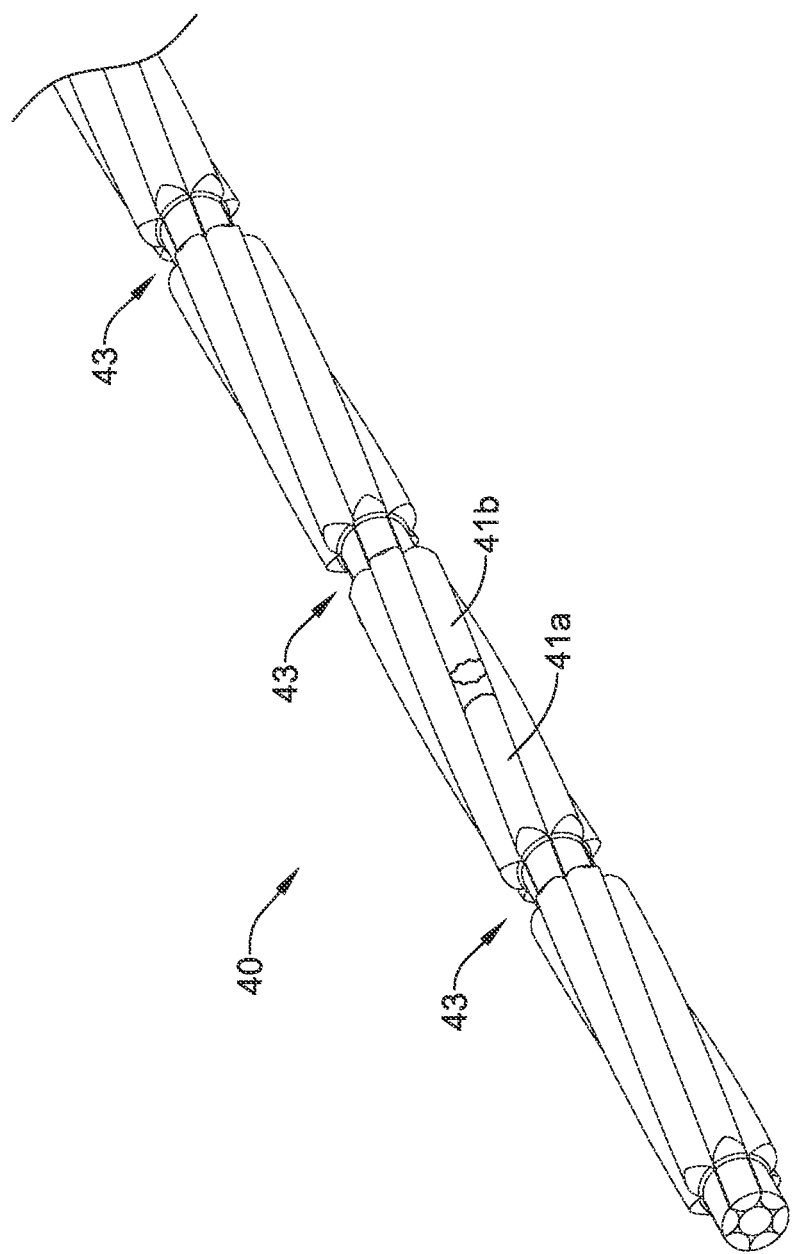

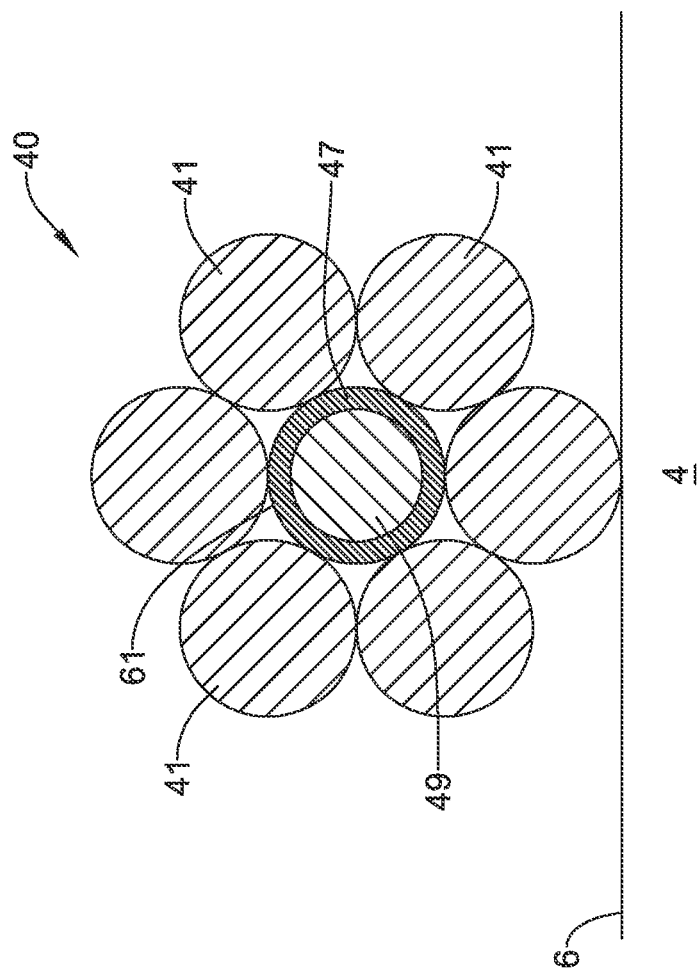

GROUNDING ROPE FOR A SHAFT GROUNDING APPARATUS OF A DYNAMO-ELECTRIC MACHINE

TECHNICAL FIELD

The disclosure is directed to a grounding apparatus including a grounding rope and a guide for maintaining the grounding rope against a rotating mechanism of an electric machine. More particularly, the disclosure is directed to a grounding rope configured to ground an electrically conductive surface of a rotating shaft of an electric machine.

BACKGROUND

In many electric devices, such as electric generators and electric motors, stray voltage may build up on components of the electric device which may adversely affect components of the device, such as bearings within the electric device, and shorten the life of the electric device. In order to prevent current flow through these components, a grounding apparatus may be used to ground components of the electric device. Such grounding apparatus include grounding brushes, grounding straps, grounding ropes and other grounding devices configured to ground the rotating shaft of the electric device.

Accordingly, there is a need to provide alternative shaft grounding apparatus to ground components of an electric device, such as the rotating shaft of an electric device.

SUMMARY

The disclosure is directed to several alternative designs, materials and methods of manufacturing grounding ropes and associated guiding structures and assemblies, and uses thereof.

Accordingly, one illustrative embodiment is an assembly for electrically grounding a rotatable conductive shaft of a dynamo-electric machine. The assembly includes a rope member and a rope guide. The rope member has a first end, a second end, and a length therebetween. The rope guide is configured to guide the rope member on an electrically conductive surface of a rotating shaft. The rope member includes a plurality of conductive wires extending along the length and one or more discrete fixation points intermediate the first and second ends. Two or more of the plurality of conductive wires are affixed together at each of the discrete fixation points.

Another illustrative embodiment is an assembly for electrically grounding a rotatable conductive shaft of a dynamo-electric machine. The assembly includes a rope member including a plurality of conductive members configured to be positioned in electrical contact with a rotating conductive surface of the dynamo-electric machine. At least one of the plurality of conductive members is an insulated conductive member having an insulation covering thereon such that the insulated conductive member is electrically insulated from the rotating conductive surface. The insulation covering is configured to be worn away to permit electrical contact between the insulated conductive member and the rotating conductive surface to generate a notification signal indicative of a wear state of the rope member.

Another alternative embodiment is a method of electrically grounding a rotatable conductive shaft of a dynamo-electric machine. The method includes positioning an electrically grounded rope member in contact with a conductive surface of the dynamo-electric machine. The rope member may include a plurality of conductive members. The plurality of conductive members may be affixed together at first and second spaced apart fixation points intermediate first and second ends of the rope member. The rope member may contact the rotatable shaft until a first one of the conductive members is worn sufficiently to separate the first conductive member into first and second discrete segments. The first discrete segment may remain affixed to the remainder of the plurality of conductive members at the first fixation point and the second discrete segment may remain affixed to the remainder of the plurality of conductive members at the second fixation point.

Another alternative embodiment is a method of electrically grounding a rotatable conductive shaft of a dynamo-electric machine. The method includes positioning an electrically grounded rope member in contact with a conductive surface of the dynamo-electric machine. The rope member may include a plurality of conductive members and at least one insulated conductive member having an insulation covering surrounding a conductive portion of the insulated conductive member such that the conductive portion may be electrically insulated from the rotating conductive surface. The method may also include wearing away a portion of the insulation covering until a portion of the conductive portion makes electrical contact with the rotating conductive surface. The method may also include sending a notification signal of a wear state of the rope member upon establishing electrical contact between the conductive portion of the insulated conductive member and the rotating conductive surface.

The above summary of some example embodiments is not intended to describe each disclosed embodiment or every implementation of the aspects of the disclosure.

BRIEF DESCRIPTION OF THE DRAWINGS

The aspects of the disclosure may be more completely understood in consideration of the following detailed description of various embodiments in connection with the accompanying drawings, in which:

FIG. 7 is a perspective view of an exemplary grounding rope in a wear state;

FIG. 8A is a cross-sectional view of the grounding rope along line 8-8 of FIG. 5;

Figure 1:
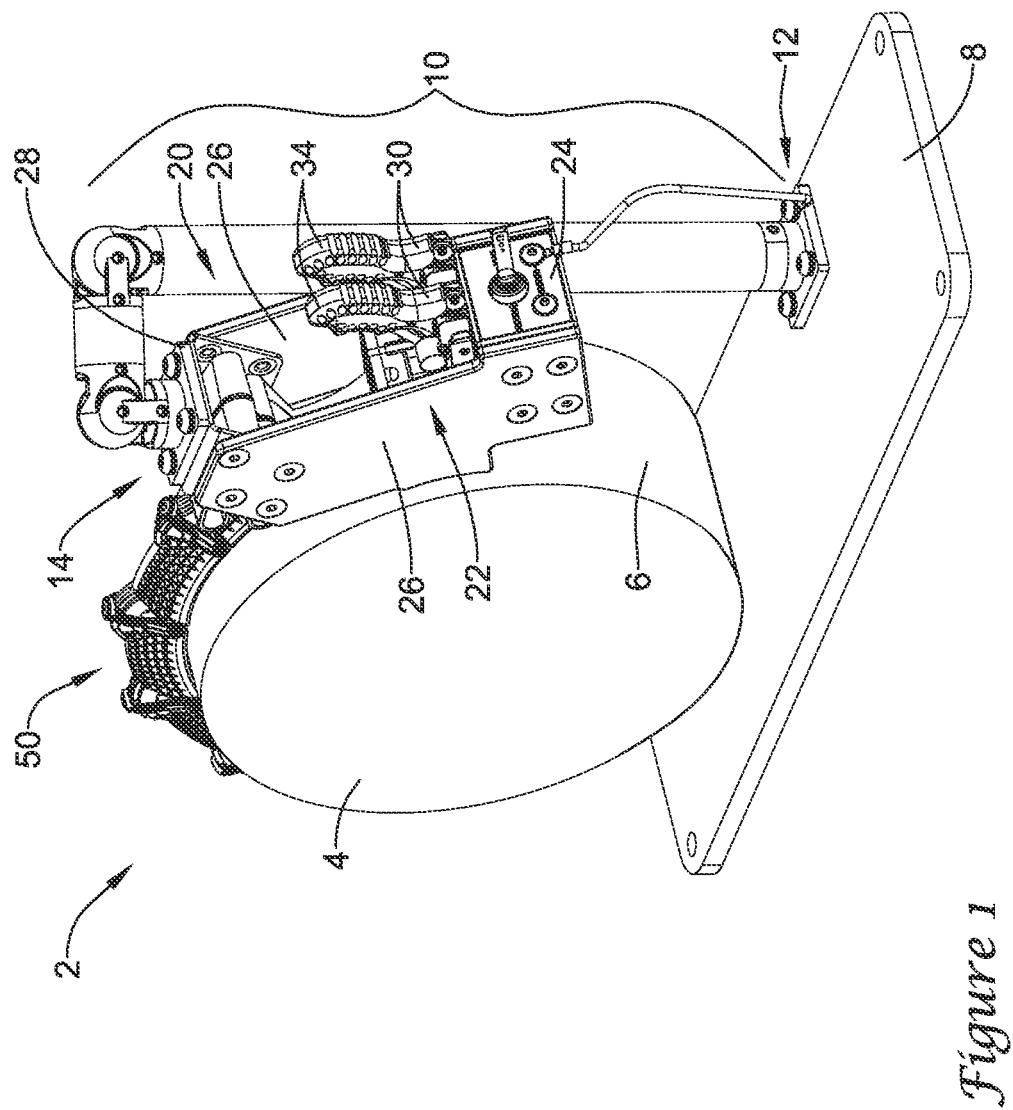
FIG. 1 is a perspective view of a portion of a rotating mechanism of an electric machine having a shaft grounding apparatus positioned on the shaft.

While the aspects of the disclosure are amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

FIG. 1 illustrates a portion of an electric machine 2 having a rotating mechanism, such as a rotating shaft 4. The electric machine 2 may be a dynamo-electric machine, such as an electric generator which converts mechanical energy into electrical energy, or an electric motor which converts electrical energy into mechanical energy. Accordingly, the rotating shaft 4 may be a collector ring, or similar structure, of an electric generator or a commutator, or similar structure of an electric motor adapted and configured to interact with or be a part of a sliding connection to complete an electrical circuit between a fixed and a moving conductor to pass electrical current therebetween. For example, in at least some generators or motors, the collector rings or commutators are adapted and configured to complete a circuit with brush assemblies or riggings within the generator or motor. Those of skill in the art will recognize that the size and configuration of the rotating shaft 4 may vary, depending on the type and/or size of the generator or motor in which the rotating shaft 4 is used. For example, in some industrial applications, the rotating shaft 4 may have a diameter of 10 inches or more, 12 inches or more, 14 inches or more, 16 inches or more, 18 inches or more, 20 inches or more, 22 inches or more, or 24 inches or more. In other applications, the rotating shaft 4 may have a diameter of 10 inches or less, 8 inches or less, or 6 inches or less.

The rotating shaft 4, a portion of which is illustrated in FIG. 1, may be an elongate cylindrical shaft having an electrically conductive outer peripheral surface 6 configured to be in sliding electrical contact with one or more brushes of a brush holder assembly. An exemplary brush holder assembly is described in U.S. Pat. No. 7,034,430, herein expressly incorporated by reference in its entirety. In some instances, a shaft grounding apparatus 20 may be positioned proximate the rotating shaft 4 to ground the rotating shaft 4. One such shaft grounding apparatus 20 is further described in and relates to the subject matter contained in U.S. Pat. No. 8,493,707 entitled GROUNDING ROPE GUIDE FOR A DYNAMO-ELECTRIC MACHINE filed on Aug. 5, 2011, which is expressly incorporated herein by reference in its entirety.

A mounting fixture 10 may be used to position the shaft grounding apparatus 20 in close proximity to the rotating shaft 4. In some instances, the mounting fixture 10 may include a first end 12 mounted to a base 8, or other stationary structure, and a second end 14 mounted to the shaft grounding apparatus 20. One such mounting fixture 10, is further described in and relates to the subject matter contained in the U.S. patent application Ser. No. 13/204,176 entitled MOUNTING FIXTURE INCLUDING AN ARTICULATION JOINT filed on Aug. 5, 2011 and published as U.S. Patent App. No. 2013/0034380, which is expressly incorporated herein by reference in its entirety. However, it is understood that the mounting fixture 10 of any desired configuration to position the shaft grounding apparatus 20 in close proximity to the rotating shaft 4.

The shaft grounding apparatus 20 may include an electrical box 22 housing components of the shaft grounding apparatus 20. For example, the electrical box 22 may include one or more, or a plurality of brush holders 30 including brushes 32 in electrical contact with the electrically conductive peripheral surface 6 of the rotating shaft 4. The brush holders 30 may also include a handle 34 for removing the brush holder 30 from the electrical box 22. In some instances, the brush holders 30 may be similar to those described in U.S. Pat. No. 7,034,430. The electrical box 22 may also include a control box 24 for controlling the flow of electricity from the electrical box 22.

The shaft grounding apparatus 20 may also include a rope guide 50 extending from the electrical box 22. For example, the electrical box 22 may include first and second side panels 26 secured (e.g., bolted) to a mount 28 of the mounting fixture 10 and to the rope guide 50.

Figure 2:
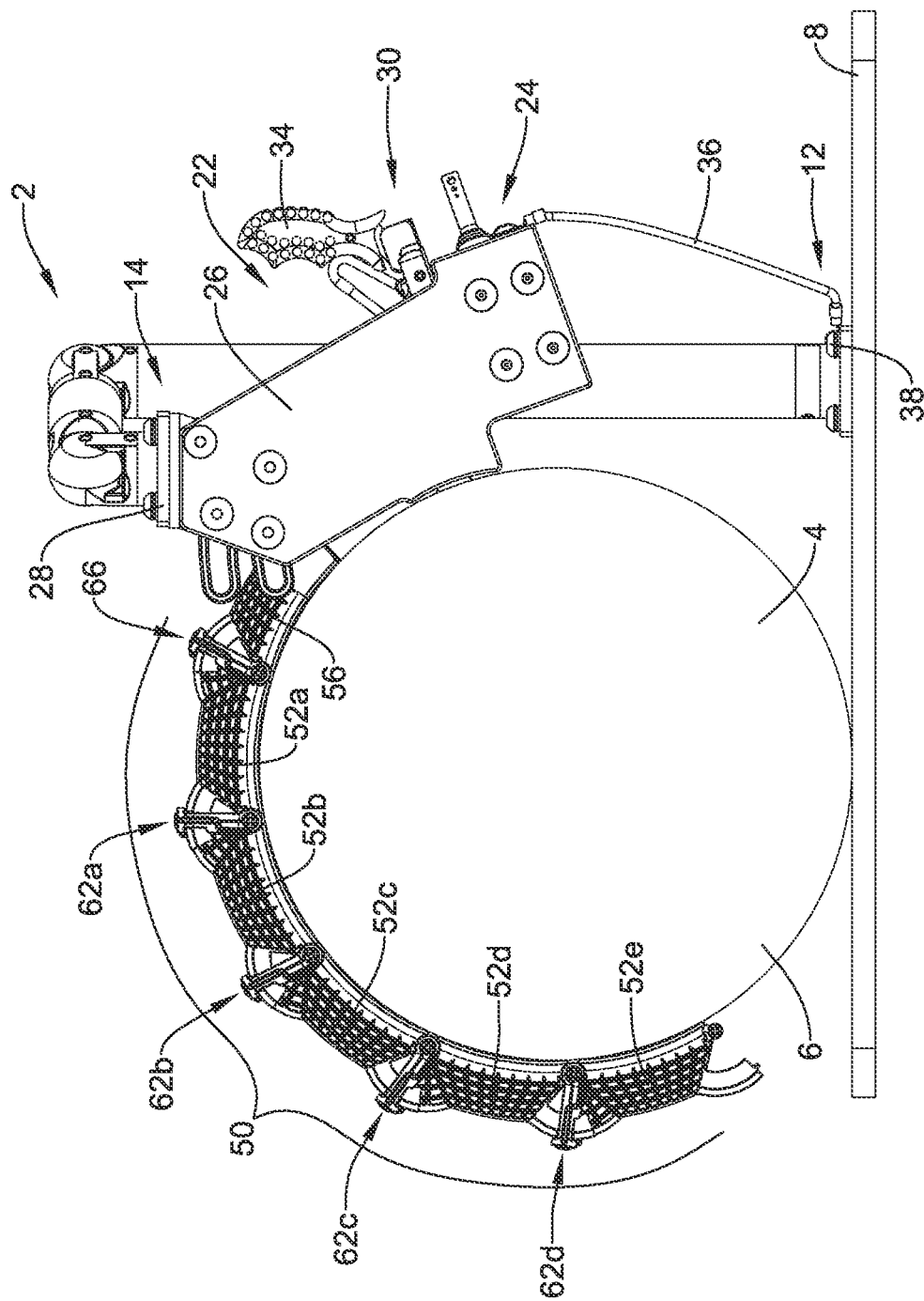
FIG. 2 is a side view of the shaft grounding apparatus of FIG. 1 positioned around the shaft of an electric machine.
Figure 3:
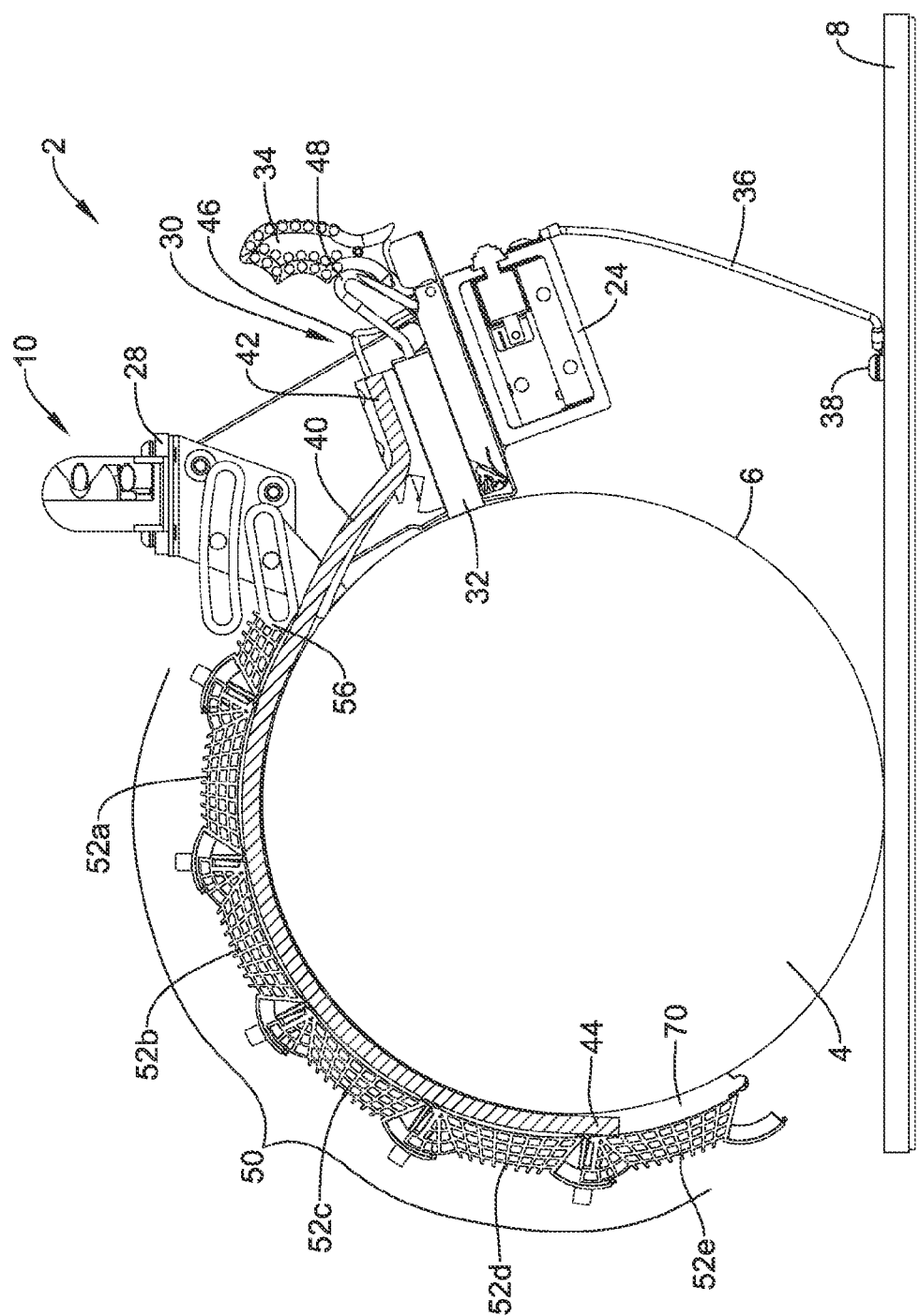
FIG. 3 is a cross-sectional view of the shaft grounding apparatus of FIG. 1 positioned around the shaft of an electric machine.

Turning to FIGS. 2 and 3, the rope guide 50 may be an adjustable rope guide configured to guide a grounding rope 40 on the electrically conductive surface 6 of the rotating shaft 4. For instance, the adjustable rope guide 50 may be adjustable between a first position having a first radius of curvature and a second position having a second radius of curvature greater than the first radius of curvature to provide the adjustable rope guide 50 with a variable radius of curvature to closely follow a radius of curvature of the rotating shaft 4. In some embodiments, the adjustable rope guide 50 may include a connector segment 56 and a plurality of articulating segments 52 configured to provide the adjustable rope guide 50 with a variable radius of curvature to closely follow a radius of curvature of the rotating shaft 4. In some embodiments, the connector segment 56 and/or the articulating segments 52 may be formed of a polymeric material, such as injection molded of a polymeric material, making the components of the rope guide 50 electrically insulated.

Depending on the diameter of the rotating shaft 4, and thus the length of the grounding rope 40, the rope guide 50 may include one, two, three, four, five, six or more articulating segments 52 pivotably coupled together at hinge points 62. For example, the illustrated rope guide 50 includes a first articulating segment 52*a*, a second articulating segment 52*b*, a third articulating segment 52*c*, a fourth articulating segment 52*d*, and a fifth articulating segment 52*e*, with a first hinge point 62*a* between the first and second articulating segments 52*a*, 52*b*, a second hinge point 62*b* between the second and third articulating segments 52*b*, 52*c*, a third hinge point 62*c* between the third and fourth articulating segments 52*c*, 52*d*, and a fourth hinge point 62*d* between the fourth and fifth articulating segments 52*d*, 52*e*. The first articulating segment 52*a* may also be pivotably coupled to the connector segment 56 at a hinge point 66.

The electrical pathway for grounding the rotating shaft 4 may be further understood with reference to FIG. 3. The electrical pathway may include a grounding rope 40 formed of a conductive material, such as copper or a copper alloy. The grounding rope 40, which extends through a channel 70 of the rope guide 50, may be positioned against the conductive surface 6 of the rotating shaft 4 such that the rotating shaft 4 slides against the grounding rope 40 as the rotating shaft 4 is rotating. The grounding rope 40 may be formed of a plurality of twisted multi-filar strands of conductive material, such as copper, or a copper alloy wires. In other instances, the grounding rope 40 may have a different configuration. As used herein, the term "grounding rope" includes alternative configurations such as a cable, wire, braid, band, strap or other elongate electrically conductive structure.

The grounding rope 40 may include a first end 42 coupled to a component in the electrical box 22 and a second end 44 hanging over the rotating shaft 4 in the direction of rotation of the rotating shaft 4. In some instances, the grounding rope 40 may have a length such that about 1 to 2 inches of the grounding rope 40 extends along the tangent line beyond the tangent between the conductive surface 6 and the grounding rope 40.

In some embodiments, the first end 42 of the grounding rope 40 may be secured to a brush holder 30 in the electrical box 22. For example, the first end 42 of the grounding rope 40 may be clamped between two plates of the brush holder 30 in some instances. One of the strands 46 of the grounding rope 40 may extend further and be secured to a terminal of the brush holder 30 with a shunt 48 extending from the brush 32 of the brush holder 30, also in contact with the conductive surface 6 of the rotating shaft 4. From the terminal of the brush holder 30, the electrical pathway may pass through the control box 24 to a grounding wire 36 to ground 38. Thus, the grounding rope 40 may be connected to ground 38 through the electrical pathway passing through the electrical box 22, and thus grounded. In other embodiments, the first end 42 of the grounding rope 40 may be attached directly to ground 38 (e.g., a grounding post), or another component electrically coupled to ground 38, without being attached to a brush holder 30.

Figure 4:
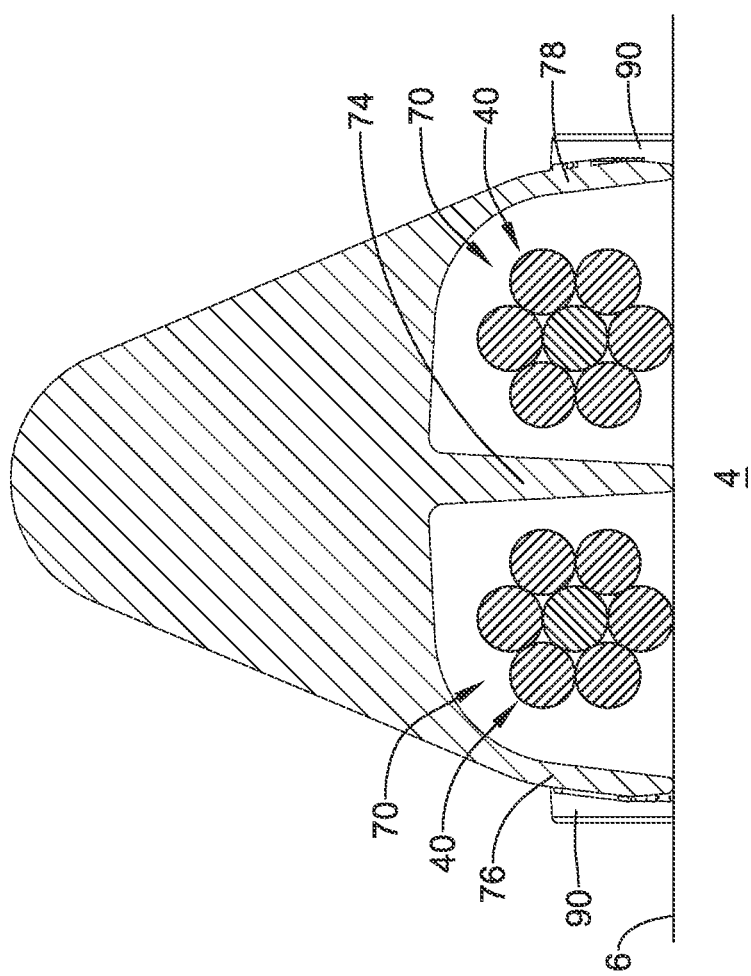
FIG. 4 is a cross-sectional view of the adjustable rope guide and grounding rope of FIG. 2.

FIG. 4 illustrates channels 70 provided in the rope guide 50 configured to receive the grounding ropes 40 for positioning along the conductive surface 6 of the rotating shaft 4. As can be seen from the figures, a first channel 70 may be defined between a first side wall 76 on the first side of the guide segment 52 and a divider wall 74, and a second channel 70 may be defined between a second side wall 76 on the second side of the guide segment 52 and the divider wall 74. The channels 70 may extend parallel to one another to position the grounding ropes 40 around a portion of the circumference of the rotating shaft 4. Thus, the channels 70 may open out to the bottom of the guide segments 52 facing the conductive surface 6 of the rotating shaft 4.

The shaft grounding apparatus 20 may be mounted proximate to the rotating shaft 4 to electrically ground the shaft 4 of the electric machine 2. For example, the grounding rope 40 may be placed in contact with the circumferential surface 6 of the rotating shaft 4. For instance, the grounding rope 40 may be draped over the rotating shaft 4 with the free second end 44 of the grounding rope 40 extending in the direction of rotation of the rotating shaft 4. It is noted that in some instances, multiple grounding ropes 40 (depending on the number of channels 70 provided in the rope guide 50) may be draped over the rotating shaft 4 to position the ropes 40 in contact with the surface 6 of the rotating shaft 4.

The adjustable rope guide 50 may also be positioned around a portion of the circumferential surface 6 of the rotating shaft 4 with the rope 40 extending along the channel 70 of the rope guide 50. In instances in which the rope guide 50 includes multiple channels 70, a rope 40 may be positioned in and extend along each channel 70 of the rope guide 50.

In order to accommodate the radius of curvature of the rotating shaft 4 such that the radius of curvature of the articulating segments 52 of the rope guide 50 closely matches the radius of curvature of the rotating shaft 4 and the lower edges of the articulating segments are positioned proximate the surface 6 of the rotating shaft 4, adjacent articulating segments 52 of the rope guide 50 may be pivoted relative to each other to adjust the radius of curvature of the adjustable rope guide 50. Thus, the rope(s) 40 may be circumferentially constrained in the channel(s) 70 of the rope guide 50 along a portion of the circumference of the rotating shaft 4.

In some instances, the connector segment 56 and the articulating segments 52 of the rope guide 50 may be adjusted from a first minimum extent having a radius of curvature of 10 inches or less, 8 inches or less, or 6 inches or less to accommodate a similarly sized rotating shaft 4 to a second maximum extent having a radius of curvature of 10 inches or more, 12 inches or more, 14 inches or more, 16 inches or more, 18 inches or more, or 20 inches or more to accommodate a similarly sized rotating shaft 4. In some instances, the articulating segments 52 may be adjusted to extend substantially flat, thus accommodating rotating shafts 4 having an infinitely large diameter. Accordingly, through the adjustability of the rope guide 50, the rope guide 50 may be mounted to a range of sizes of rotating shafts 4, such as shafts 4 having diameters in the range of 6 to 36 inches, in the range of 6 to 24 inches, in the range of 6 to 20 inches, in the range of 6 to 18 inches, in the range of 6 to 16 inches, in the range of 6 to 14 inches, or in the range of 6 to 12 inches, in some instances.

Once the rope guide 50 has been adjusted to the desired radius of curvature to accommodate the diameter of the rotating shaft 4, the hinge points 62, 66 may be clamped to prevent further pivotable movement between adjacent guide segments 52, and between the connector segment 56 and the first guide segment 52*a*.

Accordingly, the rope guide 50 may guide the grounding rope(s) 40 along the rotating surface 6 of the rotating shaft 4. The grounding rope(s) 40 may be electrically grounded (e.g., connected to ground) to draw stray voltage off of the rotating shaft 4 to prevent current flow through bearings and/or other components of the electric machine 2 which could adversely affect the electric machine 2.

Figure 5:
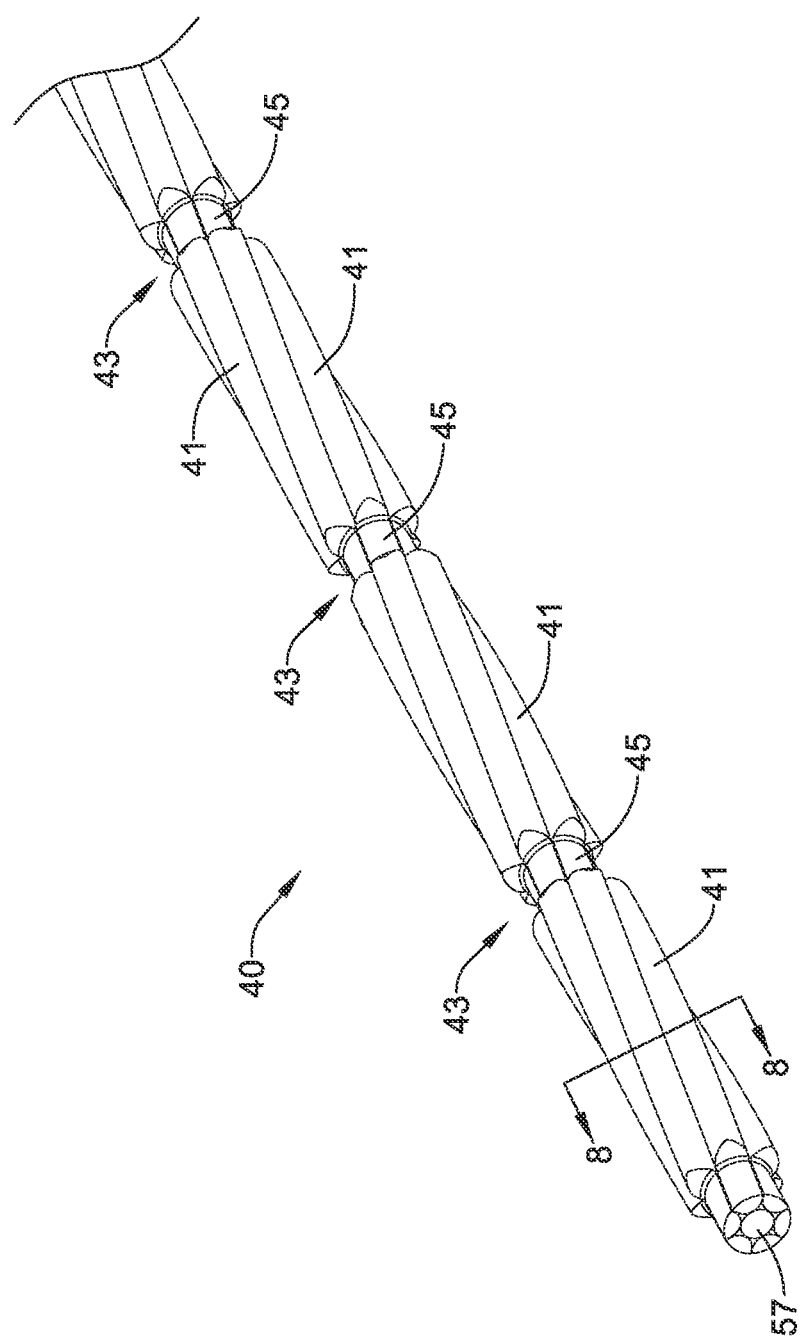
FIG. 5 is a perspective view of an exemplary grounding rope with discrete fixation points arranged along the length of the grounding rope.

FIG. 5 shows a perspective view of an exemplary grounding rope 40. The grounding rope 40 may include a plurality of electrically conductive members 41. The plurality of conductive members 41 may include individual conductive members 41 arranged in any desired arrangement to collectively form the grounding rope 40. Individual conductive members 41 may be formed from any conductive material. For example, the conductive members 41 may be formed from copper or a copper alloy. The plurality of conductive members 41 may include two or more, three or more, four or more, five or more, or six or more conductive members 41 in some instances. Additionally, the plurality of conductive members 41 may include a center member 57 around which the remainder of the electrically conductive members 41 may be arranged. The center member 57, which may be an electrically conductive member in some instances, may be formed from the same material as the individual conductive members 41 arranged therearound, or the central member 57 may be formed from a different material, if desired.

Figure 9:
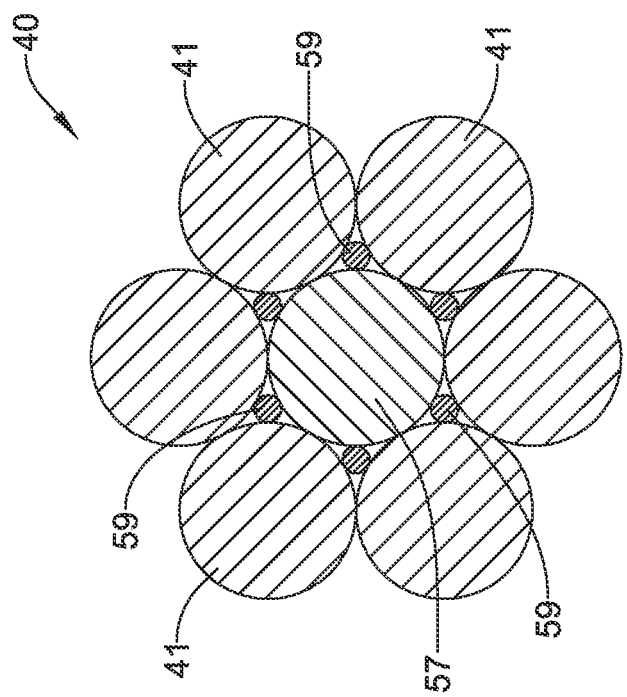
FIG. 9 is a cross-sectional view of another exemplary embodiment of a grounding rope include non-conductive members intermixed with conductive members.

While the conductive members 41 may be formed from a conductive material, it is additionally contemplated that the grounding rope 40 may include non-conductive members 59 formed from a non-conductive material. FIG. 9 is a cross-sectional view of one exemplary embodiment of the grounding rope 40 including one or more non-conductive members 59 arranged with the conductive members 41. For example, non-conductive materials may include plastic, paper, carbon fiber, felt or any other non-conductive material or combination thereof. Inclusion of one or more non-conductive members 59 among the conductive members 41 may clean, lubricate and improve the electrical conductivity of the grounding rope 40 during use, if desired.

The conductive members 41 may be arranged in any desired orientation. For example, as shown in FIG. 5, the conductive members 41 may be twisted together to form the plurality of conductive members 41. Additionally, the conductive members 41 may be wound, spiraled, braided or knitted together to form the plurality of conductive members 41 of the grounding rope 40. The conductive members 41 may also be arranged around a center member 57. For example, conductive members 41 may be spiraled, wrapped, twisted, braided, knitted, rotated, or helically wound around the center member 57 in some instances. Further, it is contemplated that the conductive members 41 helically arranged around the center member 57 may include both conductive, non-conductive or any combination of conductive and non-conductive materials.

The plurality of conductive members 41 may also include discrete fixation points 43 located intermediate the first end 42 and the second end 44 of the grounding rope 40. Fixation points 43 can be formed at any point along the grounding rope 40 with each discrete fixation point 43 spaced apart from adjacent fixation points. The discrete fixation points 43 may be uniformly spaced from adjacent fixation points 43 or non-uniformly spaced apart from adjacent fixation points 43, if desired. In some instances, the discrete fixation points 43 may be spaced apart by a distance of about 1 inch, about 2 inches, about 3 inches, or other desired distance, for example.

The fixation points 43 may affix individual conductive members 41 of the grounding rope 40 together at each fixation point 43 while the portion of the individual conductive members 41 spanning between adjacent fixation points 43 may not be affixed together. For example, an individual conductive member 41 may be welded to another individual conductive member 41 to form a welded fixation point 45. The welded fixation point 45 may be constructed by a variety of welding methods. For example, the welding method may include ultrasonic welding, or another welding technique, if desired. Further, all individual conductive members 41 which form the plurality of conductive members 41 of the grounding rope 40 may all be welded together, such as by ultrasonic welding, to form each welded fixation point 45.

Figure 6:
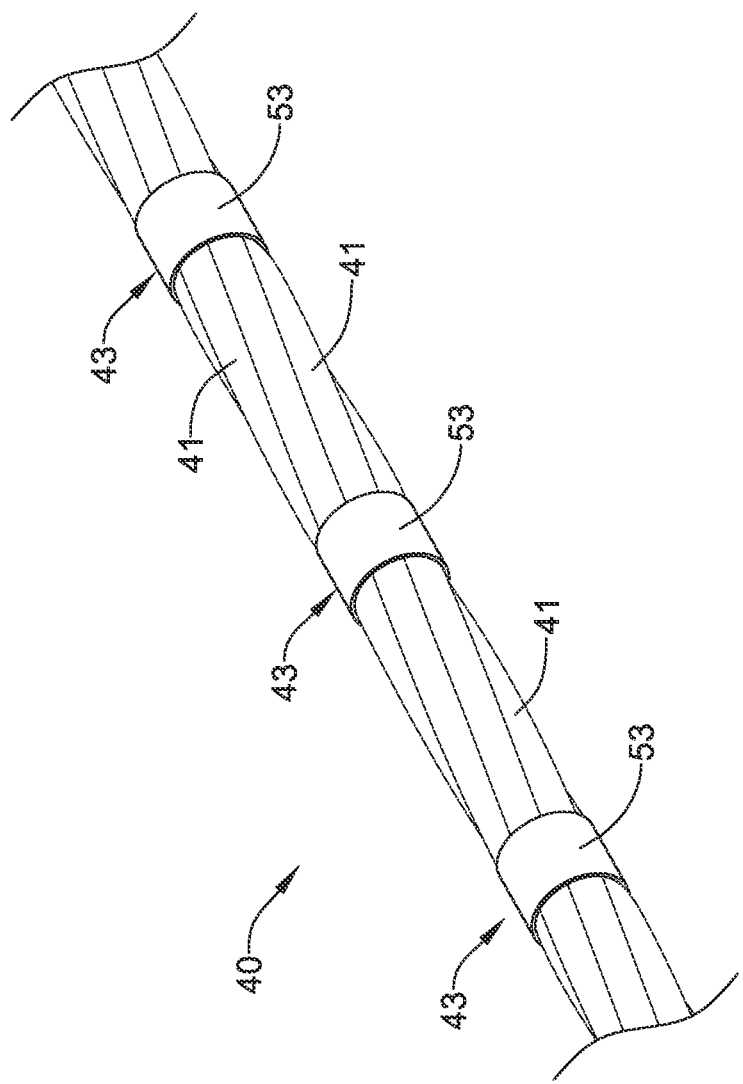
FIG. 6 is a perspective view of another exemplary grounding rope with discrete fixation points arranged along the length of the grounding rope.

As an alternative to welding individual conductive members 41 to form fixation points 43, other fixation methods may be utilized to form discrete fixation points 43, if desired. For example, FIG. 6 shows another embodiment of an exemplary grounding rope 40 which includes a plurality of conductive members 41. The conductive members 41 further include individual conductive members 41 connected at fixation points 43 by banding members 53. Banding members 53 may be formed from any electrically conductive material or non-conductive material. For example, the banding member 53 may be formed from copper or a copper alloy. Alternatively, the banding members 53 may be formed from a non-conductive material such as a plastic material. The banding members 53 may be crimped or clamped, molded, adhered, or otherwise formed or placed onto the plurality of conductive members 41 by any method which affixes the individual conductive members 41 together at the fixation points 43.

In addition to welding and banding, the fixation points 43 may be formed from a variety of other processes, methods or techniques. For example, the fixation points 43 may be formed by brazing, crimping, solidifying with adhesive, solidifying with a binding material or any other suitable method for affixing individual conductive members 41 together at the fixation points 43.

Affixing the plurality of conductive members 41 together at the fixation points 43 may help prevent the grounding rope 40 from coming apart during its life cycle, extending the life of the grounding rope 40. Over time, as the grounding rope 40 slides across rotating shaft 4, the grounding rope 40 will begin to wear due to friction between the grounding rope 40 and the shaft 4 and/or electrical wear of the grounding rope 40. Wear of the grounding rope 40 may manifest as a deterioration of one or more of the conductive members 41. The deterioration of one or more of the conductive members 41 may result in complete separating of one or more conductive members 41 of the grounding rope 40 into two discrete segments at some wear state. FIG. 7 illustrates a single conductive member 41 of the plurality of conductive members 41 being separated into a first discrete segment 41*a* and a second discrete segment 41*b* of the conductive member 41, with a break in the conductive member 41 between the discrete segments 41*a*, 41*b*.

As shown in FIG. 7, the grounding rope 40 includes fixation points 43 as discussed above. After being worn into two discrete segments 41*a*, 41*b*, a portion of the first segment 41*a* of the conductive member 41 may remain between the adjacent fixation points 43 immediately on either side of the break in the conductive member 41, and a portion of the second discrete segment 41*b* of the conductive member 41 may remain between the adjacent fixation points 43 immediately on either side of the break in the conductive member 41. When the discrete segments 41*a* and 41*b* are separated or disunited, the discrete segments 41*a*, 41*b* of the grounding rope 40 may be maintained as a portion of the grounding rope 40. For instance, when severed, the discrete segments 41*a* and 41*b* of the worn conductive member 41 may tend to unravel, pull apart, disconnect or separate from the remaining conductive members 41 of the grounding rope 40. However, the fixation points 43 may maintain the discrete segments 41a, 41b affixed to the remainder of the conductive members 41, thus permitting the segments 41a and 41b to unravel only to the immediately adjacent fixation points 43 on either side of the break in the conductive member 41. Therefore, the discrete segments 41a and 41b may be prevented from unraveling beyond the fixation points 43 immediately on either side of the break in the conductive member 41. Thus, the segment of the broken conductive member 41 of the grounding rope 40 extending from the break in the broken conductive member 41 to the free end 44 of the grounding rope 40 may remain affixed to the remainder of the conductive members 41 of the grounding rope 40 via one or more fixation points 43 between the break in the conductive member 40 and the free end 44 of the grounding rope 40. Accordingly, by including fixation points 43 periodically along the length of the grounding rope 40, the fixation points 43 prevent the grounding rope 40 from coming apart as it wears, increasing the useful life of the grounding rope 40. In other words, the first discrete segment 41a may remain affixed to the remainder of the plurality of conductive members 41 at the first fixation point 43 immediately on one side of the break in the broken conductive member 41 and the second discrete segment 41b may remain affixed to the remainder of the plurality of conductive members 41 at the second fixation point immediately on the other side of the break in the broken conductive member 41.

While the embodiment in FIG. 7 shows a single conductive member 41 being worn through, it is contemplated that more than one conductive member 41 may be worn through as the grounding rope 40 wears. In the event that more than one conductive member 41 is worn through, the fixation points 43 would act to prevent all the worn conductive members 41 from unraveling beyond the fixation points 43. As long as at least one conductive member 41 is intact (e.g., unbroken) between any two adjacent fixation points 43 (i.e., extends continuously between adjacent fixation points 43), the grounding rope 40 will remain whole.

As discussed, grounding rope 40 may begin to wear as it slides along conductive surface 6 of shaft 4. Therefore, in some instances it may be desirable to identify when the grounding rope 40 has reached a wear state in which it needs replacement. One solution to this problem includes incorporating an insulated conductive member which may form an electrical pathway with the conductive surface of the shaft 4 at some point in time when the insulation around the conductive member has worn away sufficiently to bring the conductive member into electrical contact with the shaft 4. Once established, the electrical pathway may transmit an alert signal indicating the grounding rope 40 needs replacement.

Figure 8B:
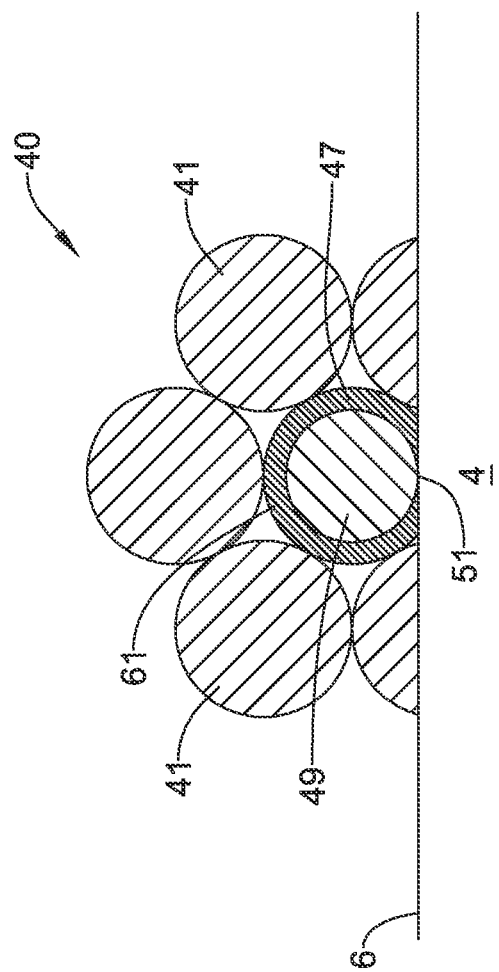
FIG. 8B is a cross-sectional view of the grounding rope in a wear state.

FIG. 8A is a cross-section view of one such embodiment of the grounding rope 40 in contact with the conductive surface 6 of shaft 4. In this embodiment, the grounding rope 40 includes at least one insulated conductive member 61 surrounded by a plurality of conductive members 41 in electrical contact with the shaft 4. It is noted that although the grounding rope 40 is shown with a single insulated conductive member 61, in other instances the grounding rope 40 may include more than one insulated member 61, if desired. Further, even though FIG. 8A shows insulated member 61 arranged in the center of the conductive members 41, it is contemplated that the insulated conductive member 61 and the conductive members 41 could be arranged in any desired orientation. The insulated member 61 may include a non-conductive (i.eg. electrically insulative) outer sheath 47 and an inner electrically conductive portion 49 surrounded by the non-conductive outer sheath 47. In an unworn state, the inner conductive portion 49 of the insulated member 61 is prevented from electrically contacting the conductive surface 6 of the rotating shaft 4, electrically isolating the conductive portion 49 from the conductive surface 6 of the rotating shaft 4. However, as the grounding rope 40 slides along the rotating shaft 4, the conductive members 41 may wear and/or shift to an extent that the insulated member 61 is brought into contact with rotating shaft 4. As the insulated conductive member 61 wears against the rotating shaft 4, the non-conductive sheath 47 may begin to wear away. For example, FIG. 8B illustrates that as the conductive member 41 wears, the insulated member 61 may contact the rotating shaft 4, whereby the outer insulation sheath 47 contacts rotating shaft 4. As the shaft 4 continues to rotate, the outer insulation sheath 47 may wear at a location that exposes the inner conductive portion 49 of the insulated member 61 to the conductive surface 6 of the rotating shaft 4. As some wear state in which the shaft 4 has completely worn through the insulation sheath 47 at some point along the length of the insulated member 61, the inner conductive portion 49 of the insulated member 61 may directly contact the conductive surface 6 at an electric contact point 51 established between the conductive portion 490 and the conductive surface 6 of the rotating shaft 4. When the inner conductive portion 49 contacts the conductive surface 6, an electrical pathway may be established between the conductive portion 49 and the conductive surface 6, which may cause an electric signal to be transmitted which indicates that the grounding rope 40 has worn to an extent that it needs replacement.

The electrical signal generated may be used to inform personnel of a condition of the grounding rope 40, and/or alert, notify, schedule and/or advise maintenance, part delivery, on-site inspection, and/or other task, shut down the system, and/or otherwise perform a consultative and/or responsive function in view of the determined condition of grounding rope 40.

Those skilled in the art will recognize that aspects of the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. An assembly for electrically grounding a rotatable conductive shaft of a dynamo-electric machine, the assembly comprising:
    a rope member having a first end and a second end, and a length therebetween;
    a rope guide configured to guide the rope member on an electrically conductive surface of a rotating shaft; and
    wherein the rope member includes a plurality of conductive wires extending along the length, and wherein the rope member includes one or more discrete fixation points intermediate the first and second ends, and wherein two or more of the plurality of conductive wires are affixed together at each of the discrete fixation points.

2. The assembly of claim 1, wherein two or more of the plurality of wires are affixed together by welding at the discrete fixation points.

3. The assembly of claim 1, wherein two or more of the plurality of wires are affixed together by ultrasonic welding at the discrete fixation points.

4. The assembly of claim 1, wherein two or more of the plurality of wires are affixed together by brazing at the discrete fixation points.

5. The assembly of claim 1, wherein two or more of the plurality of wires are affixed together by crimping a band around the plurality of wires at the discrete fixation points.

6. The assembly of claim 5, wherein the band is electrically conductive.

7. The assembly of claim 1, wherein two or more of the plurality of wires are affixed together by solidifying an adhesive at the discrete fixation points.

8. The assembly of claim 1, wherein the plurality of wires are helically wound along the length of the rope member.

9. The assembly of claim 1, wherein the rope member includes at least one non-electrically conductive member arranged with the plurality of conductive wires.

10. The assembly of claim 9, wherein the non-electrically conductive member cleans or lubricates the rope member.

11. The assembly of claim 1, wherein at least one of the plurality of conductive members is an insulated conductive member having an insulation covering thereon such that the insulated conductive member is electrically insulated from the one or more other conductive members of the plurality of conductive members configured to be positioned in electrical contact with a rotating conductive surface of the dynamo-electric machine, and
wherein the insulation covering is configured to be worn away to permit electrical contact between the insulated conductive member and the rotating conductive surface to generate a notification signal indicative of a wear state of the rope member.

12. The assembly of claim 11, wherein the insulated conductive member is located in a center of the rope member with the one or more other conductive members of the plurality of conductive members surrounding the insulated conductive member.

13. The assembly of claim 12, wherein the one or more other conductive members of the plurality of conductive members are helically wrapped around the insulated conductive member.

14. The assembly of claim 11, wherein the notification signal alerts personnel of the wear state of the rope member.

15. An assembly for electrically grounding a rotatable conductive shaft of a dynamo-electric machine, the assembly comprising:
a rope member having a first end and a second end, and a length therebetween;
a rope guide configured to guide the rope member on an electrically conductive surface of a rotating shaft;
wherein the rope member includes a plurality of conductive wires, each of the plurality of conductive wires including a first end positioned adjacent the first end of the rope member and a second end positioned adjacent the second end of the rope member such that each of the plurality of conductive wires extends continuously from the first end of the rope member to the second end of the rope member;
wherein the rope member includes one or more discrete fixation points intermediate the first and second ends; and
wherein two or more of the plurality of conductive wires are affixed together at each of the discrete fixation points.

16. The assembly of claim 15, wherein two or more of the plurality of wires are affixed together by welding at the discrete fixation points.

17. The assembly of claim 15, wherein two or more of the plurality of conductive wires are affixed together by crimping a band around the plurality of conductive wires at the discrete fixation points.

18. The assembly of claim 17, wherein the band is electrically conductive.

19. The assembly of claim 15, wherein the rope member includes at least one non-electrically conductive member arranged with the plurality of conductive wires.

20. An assembly for electrically grounding a rotatable conductive shaft of a dynamo-electric machine, the assembly comprising:
a rope member having a first end and a second end, and a length therebetween;
a rope guide configured to guide the rope member on an electrically conductive surface of a rotating shaft; and
wherein the rope member includes a plurality of conductive wires extending along the length of the rope member;
wherein the rope member includes a discrete fixation point intermediate the first and second ends;
wherein two or more of the plurality of conductive wires are affixed together at the discrete fixation point; and
wherein a first portion of each of the two or more of the plurality of conductive wires affixed together at the discrete fixation point extends away from the discrete fixation point toward the first end of the rope member, and a second portion of each of the two or more of the plurality of conductive wire affixed together at the discrete fixation point extends away from the discrete fixation point toward the second end of the rope member.

21. The assembly of claim 20, wherein the two or more of the plurality of conductive wires are affixed together by welding at the discrete fixation point.

22. The assembly of claim 20, wherein the two or more of the plurality of conductive wires are affixed together by crimping a band around the plurality of conductive wires at the discrete fixation point.

23. The assembly of claim 22, wherein the band is electrically conductive.

24. The assembly of claim 20, wherein the rope member includes at least one non-electrically conductive member arranged with the plurality of conductive wires.

* * * * *